(12) United States Patent
McDonnell et al.

(10) Patent No.: US 6,607,632 B1
(45) Date of Patent: Aug. 19, 2003

(54) CYANOACRYLATE ADHESIVE COMPOSITIONS FOR BONDING GLASS

(75) Inventors: Patrick F. McDonnell, Dublin (IE); Robert J. Lambert, Dublin (IE); Edward P. Scott, Dublin (IE); Gerard M. Wren, Kildare (IE); Marie McGuinness, Dublin (IE)

(73) Assignee: Loctite (R&D) Limited, Dublin (IE)

( * ) Notice: Subject to any disclaimer, the term of this patent is extended or adjusted under 35 U.S.C. 154(b) by 0 days.

(21) Appl. No.: 09/147,676

(22) PCT Filed: Aug. 15, 1997

(86) PCT No.: PCT/IE97/00060
§ 371 (c)(1),
(2), (4) Date: Feb. 12, 1999

(87) PCT Pub. No.: WO98/07802
PCT Pub. Date: Feb. 26, 1998

(30) Foreign Application Priority Data

Aug. 16, 1996 (IE) .................................................. 960591

(51) Int. Cl.$^7$ .............................................. B32B 31/00
(52) U.S. Cl. ................................ 156/331.2; 106/287.4; 428/442; 526/298
(58) Field of Search .................. 156/331.2, 94; 526/298; 106/287.14; 428/442

(56) References Cited

U.S. PATENT DOCUMENTS 2,784,127 A * 3/1957 Joyner et al. ................ 526/298
3,262,828 A * 7/1966 Mallory et al. .............. 156/330

(List continued on next page.)

FOREIGN PATENT DOCUMENTS

| EP | 0 137 849 | 2/1985 |
| EP | 0 151 527 | 8/1985 |
| EP | 0 209 067 | 1/1987 |

(List continued on next page.)

Primary Examiner—Jeff H. Aftergut
(74) Attorney, Agent, or Firm—Steven C. Bauman (57) ABSTRACT

A one-part adhesive composition for bonding glass including:
(a) a cyanoacrylate monomer;
(b) 15 to 60% w/w of at least one plasticizer by weight of the composition;
(c) 0.01% to 5.0% w/w of at least one silane by weight of the composition. The silane may be is selected from the silanes of the Formula:

$$R'_{(4-n)} Si(OR'')_n$$

wherein: n=1 to 4; and
each R' and R" which may be the same or different represents H, hydrocarbyl, aryl, hydrocarbylaryl or a substituted derivative thereof, or those of the formula:

$$R_2\text{---}\underset{\underset{R_3}{|}}{\overset{\overset{R_1}{|}}{Si}}\text{---}R_4$$

wherein $R_1$, $R_2$, $R_3$, and $R_4$, each independently represent hydrocarbyl, aryl, hydrocarbylaryl, or a substituted derivative thereof, H or halogen or the group —$OR_5$ wherein $R_5$ represents hydrocarbyl, aryl or hydrocarbylaryl or a substituted derivative thereof and any two of the groups $R_1$, $R_2$, $R_3$ and $R_4$ may be taken together with the silicon atom to form a cycle;
with the proviso that at least one of $R_1$, $R_2$, $R_3$ or $R_4$ represents hydrocarbyl, aryl, hydrocarbylaryl or a substituted derivative thereof.

33 Claims, 2 Drawing Sheets

U.S. PATENT DOCUMENTS

| | | | | |
|---|---|---|---|---|
| 4,139,693 A | * | 2/1979 | Schoenberg | 428/442 |
| 4,277,538 A | * | 7/1981 | Beckmann et al. | 428/442 |
| 4,460,759 A | | 7/1984 | Robins | |
| 4,753,695 A | * | 6/1988 | Alexander et al. | 156/94 |
| 4,906,317 A | | 3/1990 | Liu | |
| 5,314,562 A | * | 5/1994 | McDonnell et al. | 156/331.2 |
| 6,191,202 B1 | * | 2/2001 | Greff et al. | 526/298 |

FOREIGN PATENT DOCUMENTS

| | | | |
|---|---|---|---|
| GB | 1373559 | * | 11/1974 |
| GB | 1 430 506 | | 3/1976 |
| GB | 1 529 105 | | 10/1978 |
| JP | 52-076344 | | 6/1977 |
| JP | 61-00838 | * | 12/1994 |
| SU | 1 328 361 | | 8/1987 |
| SU | 1 564 172 | | 5/1990 |

* cited by examiner

CYANOACRYLATE ADHESIVE COMPOSITIONS FOR BONDING GLASS

TECHNICAL FIELD

This invention relates to cyanoacrylate adhesive compositions particularly intended for bonding glass.

BACKGROUND ART

It is known that "instant" adhesives based on cyanoacrylate esters, while they are effective bonding agents for a wide variety of materials, do not give a permanent bond in joints involving glass. A strong bond to glass is obtained initially but generally the joint fails after a period of weeks or months at room temperature (RT) conditions. This major deficiency of cyanoacrylate adhesives is not fully understood. While this invention is not limited by-any theory, the deficiency is likely to be related to the extremely rapid speed at which these adhesives cure on glass aided by the basic nature of the surface. High stresses are generated in the bond line immediately adjacent to the glass, at a molecular level. These stresses make the polymer in the bond line uniquely susceptible to chemical or physical degradation, for example as a response to contraction and expansion of the joint with changes in RT or to hydrolytic attack by atmospheric moisture.

This major limitation of cyanoacrylate adhesives has persisted for over four decades since the materials were originally invented. Commercially available cyanoacrylate products are generally precluded from use in bonding glass particularly glass to glass bonds.

Kol'tsova et al, abstract of.Russian patent SU 1564172 describes a method of bonding cut glass by treating the surface to be joined with 20% of a 1:1 PhMe—Me$_2$CO solution of a Si-epoxy-containing oligomer, drying and then applying the adhesive (alpha-cyanoacrylate), and subsequently contacting the surfaces. The method described uses a two-part system.

JP 06100838 describes adhesives containing alpha-cyanoacrylates and an organosilicon compounds specifically Ph$_2$SiH$_2$.

GB 1,529,105 discloses cyanoacrylate based adhesives for glass and steel containing alpha-cyanoacrylates, 20% to 60% by weight of the composition of a plasticizer which is miscible with the ester and from 0.015% to 0.15% by weight of the composition of a carboxylic acid which is soluble in the ester. The adhesive is designed so as to be easily debonded when desired.

JP 52076344-A describes the pretreatment of substrates by application of organo-silane compounds of the formula R—Si(X)$_3$ where R is alkyl, alkenyl, allyl, aralkyl, cycloalkyl or cycloalkenyl group with 1 to 18 carbon atoms inclusive of those substituted by halogen, ether, OH, ester, epoxy and other groups. X is OCH$_3$, OC$_2$H$_5$, OC$_3$H$_7$, OC$_4$H$_5$, OH, Cl, Br, I, O—C(O)—CH$_3$. The pretreatment process is said to eliminate the disadvantages of alpha-cyanoacrylate based adhesives observed when applied on glass, iron and ceramics, of deterioration on weathering, water resistance and impact resistance.

GB 1,430,506 describes an adhesive composition containing N,N'-substituted bis-maleimide, alpha-cyanoacrylate and optionally containing a silane coupling agent or a diamine. The adhesive can be used to bond metal, glass, ceramic and heat resistant films and to produce resin laminations and flexible dielectric films.

GB 1 373 559 describes the use of an alkoxy or acyloxy silane in or with a cyanoacrylate adhesive composition for glass-glass or glass-rubber bonding. However the majority of the examples describe the use of the silane as a primer. Although a one-part composition is also described, there is no suggestion of including a plasticizer in it.

SU 1,328,361-A discloses a two-part cyanoacrylate adhesive system using silane derivatives which may be used in glass-glass bonding.

EPO 151,527 discloses cyanoacrylate adhesive compositions which employ calixarene compounds as additives and which give substantially reduced fixture and cure times on wood and other deactivating surfaces such as leather, ceramic, plastics and metals with chromate treated or ceramic oxide surfaces. Fumed silica fillers treated with polydialkylsiloxanes or trialkylsilanes may be employed as fillers. Plasticizers are optionally included. No mention is made of glass bonding.

U.S. Pat. No. 4,906,317 describes cyanoacrylate compositions which employ silacrown compounds as additives to give substantially reduced fixture and cure times on wood and other deactivating surfaces such as leather, ceramic, plastics and metals with chromate treated or acidic oxide surfaces. No mention is made of glass bonding.

The silacrowns of U.S. Pat. No. 4,906,317 are not silanes within the meaning of the term silane as used herein. As stated the silacrowns are prepared by transesterification of alkoxysilanes with polyethylene glycols i.e. they are reaction products of silanes but are not themselves silanes. Furthermore they do not act as free silanes. Silacrowns function as accelerators in the composition of U.S. Pat. No. 4,906,317. The silanes of the present invention act as coupling agents, a function which a silacrown does not perform.

The specific silacrowns disclosed in U.S. Pat. No. 4,906,317 and which are represented by the following formula do not function as silanes:

wherein R$^2$ and R$^3$ are organo groups which do not themselves cause polymerisation of the cyanoacrylate monomer, R$^4$ is H or CH$_3$ and n is an integer. Examples of suitable R$^2$ and R$^3$ groups are straight chain or branched chain alkyl groups having 1 to 12 carbon atoms (which may be substituted with a substituent such as a halogen atom or an alkoxy group) a straight chain or branched chain alkenyl group having 2 to 12 carbon atoms, a straight chain or branched chain alkynyl group having 2 to 12 carbon atoms, a cycloalkyl group, an aralkyl group or an aryl group, alkoxy groups such as methoxy, and aryloxy groups such as phenoxy. The R$^2$ and R$^3$ groups may contain halogen or other substituents, an example being trifluoropropyl. Groups not suitable as R$^2$ and R$^3$ groups are basic groups such as amino, substituted amino and alkylamino.

U.S. Pat. No. 4,906,317 discloses the optional inclusion of fumed silicas treated with polydialkylsiloxanes or trialkoxy-alkylsilanes. The fumed silicas are used as thickeners. The purpose of the silane which is retained on the surface of the silica is to maintain the fumed silica in a dispersion within the composition.

Fumed silicas are referred to in EP-A-0 209 067 also. Again the fumed silica is treated with trialkoxyalkysilane.

The present Applicants understand that trialkoxytrialkyl silane present in the compositions of U.S. Pat. No. 4,906,317, EP-A-0 209 067 and EP-A-0151 527 is chemically bound and immobilized on the surface of the silica in accordance with the function to retain the silica in a dispersed phase. It is not a "free" silane in that it is not a mobile component of the composition. It does not function independently of the silica in the composition. In addition, it is not free to act as a conventional coupling agent and in particular does not act as a silane coupling agent or adhesion promoter. A coupling agent or adhesion promoter acts at the interface of the adhesive and the substrate being bonded to provide a better bond between the adhesive and the substrate.

While the EP '067 patent also mentions the optional inclusion of plasticisers the object is to provide stable cyanoacrylate compositions with good thixotropic properties. It is not directed to the problem of glass bonding.

EP-A-0 137 849 relates to an alpha-cyanoacrylate-based instant adhesive composition containing benzophenonetetracarboxylic acid or its anhydride, and optionally plasticisers. A heat resistant composition is sought. No reference to the problem solved by the present invention, namely cyanoacrylate glass bonding is made in this document.

While the constituents mentioned herein are well known individually as polymer modifiers or adhesion promoters, their particular combination and use in this invention are unique, and the benefits gained in effectively bonding glass are unexpected. For example the compositions disclosed in GB 1,529,105 contain high levels of phthalate plasticizer in ethyl cyanoacrylate but the resulting adhesives are claimed to be suitable only for temporary bonding purposes on glass or steel. Two-part adhesive systems where silanes are employed to pretreat glass are described in Japanese Patent JP 5207634. The inconvenience of a two-part system is overcome by the one-part adhesive composition of the present invention.

It would be desirable to provide cyanoacrylate based adhesive compositions that overcome the deficiencies and limitations described above and gives strong durable adhesive bonds on glass, including crystal glass. It would also be desirable to provide one-part glass-bonding adhesive compositions, which are stable on storage and are also effective adhesives for bonding a wide range of other materials.

SUMMARY OF THE INVENTION

The present invention meets those desires by providing a one-part adhesive composition including (a) a cyanoacrylate monomer; (b) at least one plasticizer in the amount of 15 to 60% w/w by weight of the composition; and (c) at least one silane in the amount of 0.01% to 5.0% w/w by weight of the composition.

DETAILED DESCRIPTION OF THE INVENTION

As noted above the present invention meets those desires by providing a one-part adhesive composition including (a) a cyanoacrylate monomer; (b) at least one plasticizer in the amount of 15 to 60% w/w by weight of the composition; and (c) at least one silane in the amount of 0.01% to 5.0% w/w by weight of the composition.

A desirable content range for the plasticizer is 15 to 45% w/w of the adhesive composition, with a more desirable range being 20 to 40% w/w, such as 25 to 35% w/w. A suitable content range for the silane is 0.02 to 3.0% w/w of the adhesive composition, With a more desirable range being of 0.05 to 1.0% w/w.

The cyanoacrylate monomer suitably is of the formula $CH_2=C(CN)COOR$ wherein R is selected from:

alkyl having at least 2 carbon atoms, more particularly having 2–10 carbon atoms, including: ethyl; n-propyl; iso-propyl; n-butyl; iso-butyl; sec-butyl; n-pentyl.; iso-pentyl; n-hexyl; iso-hexyl; n-heptyl; 2-ethylhexyl; n-octyl; n-nonyl; n-decyl; alkoxyalkyl having at least 2 carbon atoms in the alkyl group, more particularly having 2–10 carbon atoms in the alkyl group, and especially having 1–10 carbon atoms in the alkoxy group, including; 2-methoxyethyl; 2-ethoxyethyl; 3-methoxybutyl; 1-methoxy-2-propyl; allyl, propargyl, cyclohexyl, and phenyl.

R is desirably butyl or octyl.

The cyanoacrylate ester for use in the present invention is suitably n-butyl-2-cyanoacrylate, although other cyanoacrylate esters may also be used.

The term "silane" as used herein includes silane hydrides and substituted silanes.

Suitable silanes may be of the formula $R'_{(4-n)}Si(OR'')_n$ wherein n=1 to 4; each R' and R", which may be the same or different, represents H, hydrocarbyl, aryl, hydrocarbylaryl or a substituted derivative thereof.

Desirably, n is 2 or 3.

Desirably, R" is $C_1$–$C_5$ alkyl, $C_1$–$C_5$ alkenyl, or —COR'" in where R'" is $C_1$–$C_5$ alkyl or $C_1$–$C_5$ alkenyl, or a substituted derivative thereof.

Desirably R' is $C_1$–$C_5$ alkyl, $C_1$–$C_5$ alkenyl, where m is 0 to 5 or —$(CH_2)_m$—O—CO—R'" in where R'" and m are as defined above, or a substituted derivative thereof.

The silane may contain a cyclic structure. If the Si atom forms part of a cycle it should not form part of a silacrown cycle (crown structure). If the Si atom forms part of a cycle, the cycle desirably should comprise no more than three oxygen atoms.

Other silanes include those of the general formula:

wherein $R_1$, $R_2$, $R_3$, and $R_4$, each independently represent hydrocarbyl, aryl, hydrocarbylaryl, or a substituted derivative thereof, H or halogen or the group —$OR_5$ wherein $R_5$ represents hydrocarbyl, aryl or hydrocarbylaryl or a substituted derivative thereof and any two of the groups $R_1$, $R_2$, $R_3$ and $R_4$ may be taken together with the silicon atom to form a cycle;

with the proviso that at least one of $R_1$, $R_2$, $R_3$ or $R_4$ represents hydrocarbyl, aryl, hydrocarbylaryl or a substituted derivative thereof.

The cyclic group may be unsubstituted or substituted with halogen or may be bridged or interrupted by one or more oxo groups and suitably four to eight atoms form the cycle.

Examples of cyclic silanes of this general formula include:
cyclohexyldimethylchlorosilane,
cyclohexyldimethylsilane, (cyclohexylmethyl) trichlorosilane.
cyclohexyltrichlorosilane,.
(3-cyclopentadienylpropyl)-triethoxysilane,
cyclopentamethylenedichlorosilane,
cyclopentamethylenedimethylsilane,
cyclotetramethylenedichlorosilane,
cyclotetramethylenedimethylsilane,
cyclotrimethylethylenedichlorosilane,
cyclotrimethylenedimethylsilane,
dihexyldichlorosilane,
diisopropenoxydimethylsilane,
diisopropylchlorosilane,
dimesityldichlorosilane,
1,1-dimethyl-1-sila-2-oxacyclohexane,
Si-methyl(4-chloro-3,5 dimethyl)benzooxasilepin methyl ester, and benzooxasilepindimethylester.

The term "hydrocarbyl" as used herein means straight-chain, branched or cyclic, aliphatic hydrocarbyl including alkyl, alkenyl and alkynyl. Hydrocarbyl groups should contain from 1 to 10 carbon atoms, such as from 1 to 5 carbon atoms, and aryl and hydrocarbylaryl groups should contain from 6 to 20 carbon atoms, such as from 6 to 10 carbon atoms. Hydrocarbyl groups are desirable, especially alkyl or alkenyl groups. The term aryl includes fused ring systems. The term hydrocarbylaryl includes a cyclic hydrocarbyl fused to an aryl ring.

A substituted derivative may also suitably be substituted with one or more halogens groups or substituted or interrupted or bridged by one or more oxo groups. Halogen may be chlorine, bromine, fluorine or iodine.

The silane constituent can suitably be one or more of a range of alkoxy silanes such as vinyltriethoxy silane, vinyltrimethoxy silane, glycidoxypropyltrimethoxy silane, ethyltriethoxy silane, dimethyldiacetoxy silane, propyltriacetoxy silane and vinylmethyldiacetoxy silane. Silanes giving a particularly good balance of compatibility and performance include methyltriacetoxy silane, 3-(methacryloxy) propyltrimethoxy silane and vinyltriacetoxy silane.

The invention also relates to a method of bonding substrates using a composition as described above. In that method, the composition is applied to at least one of the substrates and thereafter the substrates are brought together. In particular the adhesive composition of the invention is suitable for bonding glass substrates giving a more durable bond than with other compositions.

The plasticizer component can be selected from one or more conventional materials used for this purpose in adhesive compositions provided that the plasticizer is compatible and soluble in cyanoacrylate esters (see GB 1 529 105). Examples include alkyl phthalates, azelates, adipates, sebacates, citrates, phosphates, succinates, benzoates and trimellitates. Desirable plasticizers are dibutyl phthalate, benzylbutyl phthalate, diheptyl phthalate, dibutyl sebacate and diethyleneglycol dibenzoate. Blends of two or more different plasticizers are also beneficial.

It will be understood that the adhesive composition may contain an anionic polymerization inhibitor and/or free radical polymerization inhibitor in conventional amounts [see U.S. Pat. No. 4,460,759 (Robins)]. The cyanoacrylate adhesive compositions may also contain sequestering agents e.g. calixarenes, anhydrides, stabilizers, thickeners, silicas, adhesion promoters, dyes, heat resistant modifiers, perfumes and such like.

Suitably the composition of the invention comprises fillers other than silica.

The adhesives of this invention have commercial shelf-life stability.

The present invention will be further described with reference to the following examples and comparative examples. It should be noted that the scope of the invention is not limited by these examples.

EXAMPLES

Examples 1, 2 and 3 illustrate properties of constituents of the adhesive compositions of the invention but do not relate to the adhesive compositions of the invention per se.
Abbreviations Used in This Section:
CA=cyanoacrylate
RT=Room temperature
RH=Relative humidity
DBP=dibutyl phthalate Example 1

Adhesives Were Prepared as Follows:
A. 11-Butyl cyanoacrylate.
B. n-Butyl cyanoacrylate containing 30% dibutyl phthalate plasticizer.
C. Ethyl cyanoacrylate.
D. Ethyl cyanoacrylate containing 30% dibutyl phthalate plasticizer.
E. Methyl cyanoacrylate.
F. Methyl cyanoacrylate 30% dibutyl phthalate plasticizer.
G. Allyl cyanoacrylate.
H. Allyl cyanoacrylate containing 30% dibutyl phthalate plasticizer.
I. 2-methoxy ethyl cyanoacrylate.
J. 2-methoxy ethyl cyanoacrylate containing 30% dibutyl phthalate plasticizer.

Figure 1:
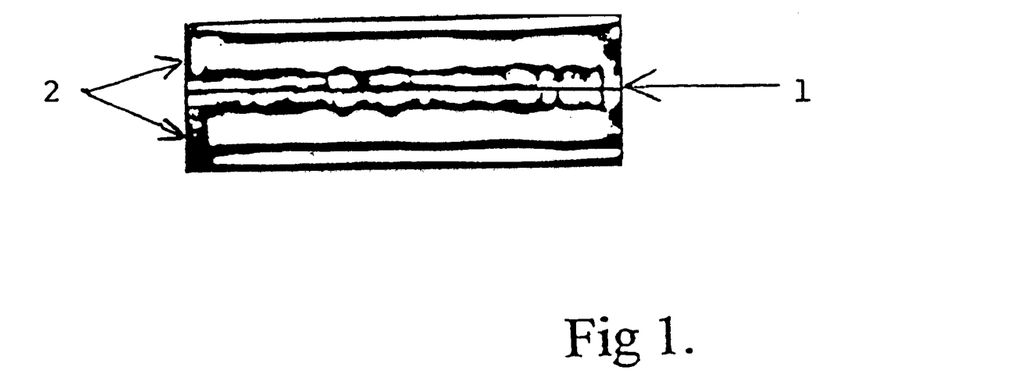
FIG. 1 is a view with plane polarized light (sodium d line) of glass bonded with a layer 1 or standard n-butyl cyanoacrylate adhesive (adhesive A in Example 1). Polarized light is used to highlight the stress patterns 2 induced in the glass.
Figure 2:
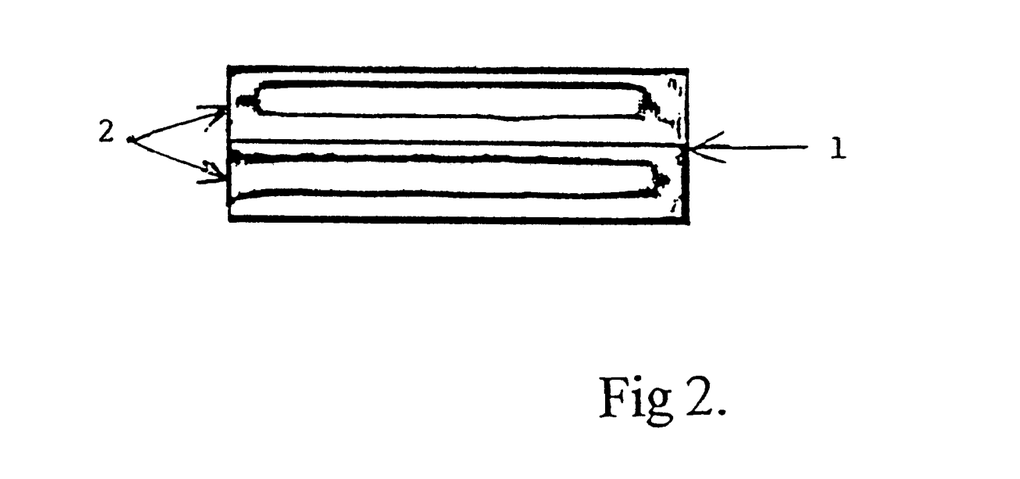
FIG. 2 is a view similar to FIG. 1 of glass bonded with a layer 1 of plasticized n-butyl cyanoacrylate adhesive (adhesive B in Example 1). The polarized light photograph shows the absence of stress patterns when the glass is bonded with n-butyl cyanoacrylate containing 30% dibutyl phthalate (DBP).
Figure 3:
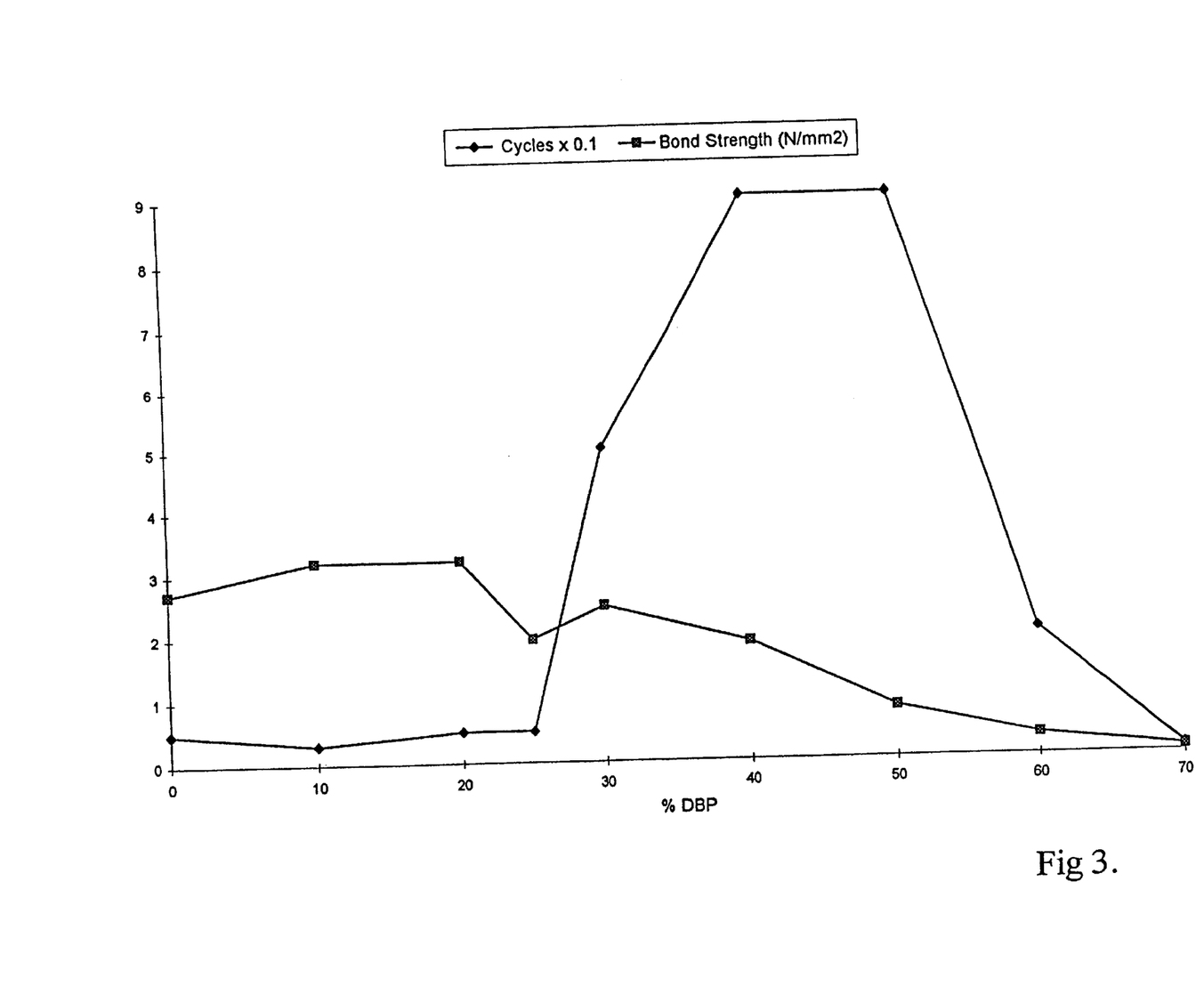
FIG. 3 shows the effect of various levels of DBP on n-butyl CA bond strength (glass bonds) and durability under repetitive dishwasher cycles. The values plotted are taken from Table I of Example 2.

Test pieces of soda glass with dimensions of 38.1×38.1× 6.35 mm were bonded with above adhesives. The bond involved the overlap of the complete surface area of 1451.6 mm$^2$. The bonds were allowed to cure for 24 hours at RT and then examined for the presence of stresses in the glass by viewing with plane polarized light (Sodium d line). Results were as follows:

| | |
|---|---|
| Stressed or partially stressed (see FIG. 1) | Adhesives A, C, D, E, F, G, H, I, J. |
| Absence of stress patterns (see FIG. 2) | Adhesive B |

This example shows that plasticized n-butyl cyanoacrylate generates a stress-free bond on glass while other cyanoacrylate/plasticizer combinations generate a stressed or partially stressed joint. While it is desired to have a completely stress free joint it will be appreciated that bonds with reduced bond stress are acceptable for the purposes of the invention.

Example 2 n-Butyl cyanoacrylate monomer was prepared by the Knoevengal condensation reaction between n-butyl cyanoacetate and formaldehyde and purified by distillation. The monomer was stabilized against spontaneous polymerization by addition of 30 ppm sulphonic acid and 1000 ppm hydroquinone. Adhesive formulations containing the stabilized n-butyl cyanoacrylate monomer and various proportions of di-n-butylphthalate plasticizer were prepared on a weight/weight basis by direct mixing of the two liquids. For example a 10% solution of di-n-butyl phthalate plasticizer in n-butyl cyanoacrylate monomer was prepared by addition of log of the plasticizer to 90 g of monomer.

Adhesive formulations containing zero %, 10%, 20%, 25%, 30%, 40%, 50%, 60% and 70% di-n-butyl phthalate were prepared in this manner.

The adhesive formulations were used to bond soda glass test pieces of dimensions 50.8×25.4×4 mm which were precleaned with isopropyl alcohol and deionized water and allowed to dry. A number of overlapped joints with a bonded area of 322.5 mm² were prepared with each adhesive formulation and allowed to cure for 24 hours at RT (20° C.+3° C.). The bond strengths were determined using an Instron Model 1185 tensile testing machine using a crosshead pulling speed of 2 mm/min. The bonds were tested for durability by subjecting them to a sequence of washing cycles in a domestic dishwasher (Tricity Bendix Model HEL8). The bonds were examined for integrity after each cycle and the number of cycles to bring about the bond failure was recorded. The test results for bond durability (No. of dishwasher cycles) and bond strength are summarized in Table I. The results suggest that (a) bond strength decreases with increasing proportions of plasticizer and levels greater than about 40% result in bonds of reduced strengths and (b) the concentration of plasticizer needed for good durability is about 30%–50%.

TABLE I (Example 2)

Bond Strength and Durability of glass-glass bonded with n-butyl cyanoacrylate adhesives containing various levels of plasticizer.

| Dibutylphthalate (%) | Bond Strength (N/mm²) | Durability (No. of Dishwasher Cycles) |
|---|---|---|
| 0 | 2.7 | 5 |
| 10 | 3.2 | 3 |
| 20 | 3.2 | 5 |
| 25 | 1.94 | 5 |

TABLE I-continued (Example 2)

Bond Strength and Durability of glass-glass bonded with n-butyl cyanoacrylate adhesives containing various levels of plasticizer.

| Dibutylphthalate (%) | Bond Strength (N/mm²) | Durability (No. of Dishwasher Cycles) |
|---|---|---|
| 30 | 2.46 | 50 |
| 40 | 1.86 | 90 |
| 50 | 0.80 | 90 |
| 60 | 0.32 | 20 |
| 70 | 0.08 | 10 |

The above table (Table I) is used in the present example to illustrate the trend in bond strength and durability of the bond with increasing concentration of dibutylphthalate. The result shown for 30% dibutylphthalate (as compared to that for 25% and 40% dibutylphthalate) would appear to be due to experimental variations, as can be seen with reference to Table II of Example 3. This experimental variation does not occur with the compositions of the invention.

Example 3

A selection of plasticizing materials were added-to a-butyl cyanoacrylate at a concentration of 30% w/w. In practice this entailed the addition of 30 g of plasticizer to 70 g of butyl cyanoacrylate monomer with mixing to give a homogeneous solution. These solutions were in effect plasticized adhesives and each was used to bond glass test pieces in the manner described in Example 2.

The bonded test pieces were clamped and allowed to cure for 24 hours at RT. The clamps were removed and a measure of the durability of the bonds determined by subjecting them to repeated washing cycles in a domestic dishwasher as described in Example 2. The bonds were examined after each cycle and the number of cycles needed to induce failure of the bond was recorded.

A list of the plasticizing materials used in the example is given in Table II together with the dishwasher durability results. The results show several of the plasticizing materials, e.g. dibutyl phthalate and diethyleneglycol dibenzoate, giving enhanced durability relative to the unplasticized control.

TABLE II (Example 3)

| ADHESIVE All based on 30% w/w Plasticizer in butyl cyanoacrylate | DISHWASHER TEST (No. of Cycles to bond failure) | | |
|---|---|---|---|
| | BOND A | BOND B | BOND C |
| Dibutyl Phthalate | 6 | 6 | 11 |
| Benzylbutyl Phthalate | 6 | 8 | 8 |
| Diisoheptyl Phthalate | 4 | 6 | 6 |
| Diheptyl Phthalate | 6 | 6 | 6 |
| Diocytyl Phthalate | 4 | 4 | 4 |
| Diisooctyl Phthalate | 4 | 6 | 6 |
| Dinonyl Phthalate | 4 | 4 | 4 |
| Diisononyl Phthalate | 4 | 4 | 4 |
| Diisodecyl Phthalate | 4 | 4 | 4 |
| Diisooctyl Azelate | 4 | 4 | 4 |
| Dioctyl Azelate | 4 | 4 | 4 |
| Diisopropyl Adipate | 4 | 4 | 4 |
| Diisobutyl Adipate | 4 | 4 | 4 |

TABLE II-continued (Example 3)

| ADHESIVE All based on 30% w/w Plasticizer in butyl cyanoacrylate | DISHWASHER TEST (No. of Cycles to bond failure) | | |
|---|---|---|---|
| | BOND A | BOND B | BOND C |
| Di-2-ethylhexyl Adipate | 4 | 4 | 4 |
| Diisodecyl Adipate | 4 | 4 | 4 |
| Dibutyl Sebacate | 6 | 6 | 6 |
| Diethyl Sebacate | 6 | 6 | 6 |
| Dioctyl Sebacate | 4 | 4 | 4 |
| Tributyl-o-acetyl Citrate | 4 | 4 | 4 |
| n-Butyl Citrate | 4 | 6 | 6 |
| Tritolyl Phosphate | 4 | 6 | 6 |
| Tris (2-ethylhexyl) Phosphate | 4 | 4 | 4 |
| n-Butyl Oleate | 4 | 4 | 4 |
| Diethyleneglycol Dibenzoate | 6 | 6 | 8 |
| Diethylhexyl Succinate | 4 | 4 | 4 |
| Bayer Silicone Oil | 4 | 4 | 4 |
| Trihexyl Trimellitate | 4 | 4 | 4 |
| Dioctyl Teraphthalate | 4 | 4 | 4 |
| Control (butyl cyanoacrylate alone) | 4 | 4 | 4 |

Example 4

Adhesive formulations based on butyl cyanoacrylate monomer (as described in Example 2) were prepared containing 30% w/w dibutyl phthalate (DBP) as constant and 0.2% of a selection of silanes as outlined in the following table of test results. The silanes were initially dissolved in the DBP before adding to the monomer (see Example 2 for details).

The adhesive formulations were used to bond soda glass test pieces of dimensions 50.8×25.4×4 mm which were precleaned with isopropyl alcohol and deionized water and allowed to dry. A number of overlapped joints with a bonded area of 322.5 mm² were prepared with each adhesive formulation. The joints were clamped and allowed to cure for 24 hours at RT (20° C.+3° C.) before any further testing. The bonds were tested for durability by subjecting them to a sequence of washing cycles in a domestic dishwasher (Tricity Bendix Model HEL8). The bonds were examined for integrity after each cycle using light hand pressure and the number of cycles to bring about bond failure was recorded. The test results for bond durability (No. of dishwasher cycles) are recorded below for each silane-containing formulation and the findings show clear evidence of high resistance of the bonded glass test pieces to the specified treatment. The controls without silane showed poor resistance as did a formulation containing silicon tetraacetate.

| Silane Type (all at 0.2%) | Dishwasher Test (Number of Cycles to bond failure) | | |
|---|---|---|---|
| | Run 1 | Run 2 | Run 3 |
| Vinyltriethoxy silane | 282 | 292 | 302 |
| Vinyltrimethoxy silane | 172 | 172 | 282 |
| Glicidoxypropyltrimethoxy silane | 292 | 302 | 282+ |
| Vinyltriacetoxy silane | 162 | 202 | 262 |
| Ethyltriethoxy silane | 152 | 172 | 192 |
| Dimethyldiacetoxy silane | 125 | 172 | 252 |
| Propyltriacetoxy silane | 117 | 142 | 152 |
| Vinylmethyldiacetoxy silane | 142 | 172 | 252 |
| Silicon Tetraacetate | 7 | 7 | 7 |
| None (control) | 5 | 7 | 8 |

Example 5

Glass bonding adhesive formulations were prepared as follows and used to bond glass test pieces which were then tested for resistance to failure when aged in (a) high humidity conditions and (b) immersed in water.

Formulation A: n-butyl cyanoacrylate monomer containing 20% dibutylphthalate (DBP) and 0.06% 3-(methacryloxy)propyltrimethoxysilane, prepared as described in Example 2 above.

Formulation B: As formulation A above but containing 20% DBP and 0.3% methyltriacetoxysilane.

Formulation C: As formulation A above but containing 20% DBP and 30 0.3% methyltrimethoxysilane.

Formulation D: n-butyl cyanoacrylate monomer containing 20% DBP.

The adhesive formulations were used to bond soda glass test pieces of dimensions 50.8×25.4×4 mm which were precleaned with isopropyl alcohol and deionized water and allowed to dry. A number of overlapped joints with a bonded area of 322.5 mm² were prepared with each adhesive formulation. The joints were clamped and allowed to cure for. 24 hours at RT (20° C.+3° C.). The resistance to humidity was determined by ageing the bonded test pieces in a cabinet maintained at 40° C./95% Relative Humidity (RH) and inspecting daily until bond failure occurred, the integrity of the joint being confirmed by light hand pressure. Resistance to water was determined by immersing the bonded test pieces in water which was stored at RT (20° C.+3° C.) until bond failure (as tested daily by light hand pressure). The attached results show excellent durability under above severe ageing conditions except with Formulation D which had no added silane.

| FORMULATION | Humidity Ageing at 40° C./95% RH (days to bond failure) | | Water Immersion Ageing (days to bond failure) | |
|---|---|---|---|---|
| | Test 1 | Test 2 | Test 1 | Test 2 |
| Formulation A | 300+ | 300+ | 315+ | 315+ |
| Formulation B | 300+ | 300+ | 281 | 315 |
| Formulation C | 300+ | 300+ | 300+ | 138 |
| Formulation D | 4 | 4 | 8 | 8 |

Example 6

The viscosities mentioned in this Example were measured by the Cannon-Fenske Routine Viscometer method according to ASTM D445 (American Society for Testing and Materials). A size 200 or 300 Cannon-Fenske Routine Viscometer was used and all determinations were carried out in a water bath at 25° C.

Glass bonding adhesive formulations containing thickeners were prepared as follows:

Premix A. 25 g of polymethylmethacrylate (PMMA) powder were added to 475 g of n-butyl cyanoacrylate monomer with continuous mixing. When the powder was fully dispersed the mixture was heated for 15 minutes at 70° C. to give a clear solution which was allowed to cool to RT.

Formulation A. 70 g of Premix A above were blended with 30 g of dibutylphthalate (DBP) to give an adhesive formulation containing 30% dibutylphthalate and 3.5% PMMA. The viscosity was 31 mPas.

Formulation B. 0.2 g of methyltriacetoxysilane were dissolved in 30 g of dibutylphthalate (DBP). This solution was then added to 70 g of Premix A above to give a final adhesive formulation containing 30% DBP, 3.5% PMMA and 0.2% methyltriacetoxysilane.

Formulation C. 70 g of Premix A above were blended with 30 g of benzylbutylphthalate to give an adhesive formulation containing 30% benzylbutylphthalate and 3.5% PMMA. The viscosity was approximately 31 mPas.

Formulation D. 0.2 g of methyl triacetoxysilane were dissolved in 30 g of benzylbutylphthalate (BBP). This solution was then added to 70 g of Premix A above to give a final adhesive formulation containing 30% BBP, 3.5% PMMA and 0.2% methyltriacetoxysilane.

Soda glass test pieces of dimensions 50.8×25.4×4 mm were cleaned with isopropyl alcohol followed by deionized water and allowed to dry. Overlapped joints with a bonded area of 322.5 mm$^2$ were prepared with each adhesive of Formulations A, B, C and D above and allowed to cure for 24 hours at RT (20° C.+3° C.). The bonds were then subjected to repeated cleaning cycles in a domestic dishwasher as described earlier and the time to bond failure noted. The results demonstrate that the adhesive formulations have excellent durability.

|                       | Bond Durability (Dishwasher Cycles) | | |
|---|---|---|---|
| Adhesive Formulation | Run 1 | Run 2 | Run 3 |
| A (DBT + PMMA) | 162 | 172 | 192 |
| B (DBT + PMMA + Silane) | 262 | 332 | 332 |
| C (BBP + PMMA) | 562 | 572 | 612 |
| D (BBP + PMMA + Silane) | 432 | 502 | 512 |

In these tests, formulation C which did not contain silane showed somewhat better bond durability than formulation D which contained silane but this result is not of particular relevance because both formulations showed bond durability well beyond the number of cycles to be expected in a normal lifetime of a bonded article. The present inventors have found that there is consistency to the bond durability exhibited if a silane is present. The composition of the present invention gives consistently good bond durability. Formulation B containing silane out performed Formulation A which did not contain silane. Benzylbutyl phthalate (BBP) is a less desirable plasticizer because of its toxicity which would make it less suitable for use in a commercial adhesive.

Example 7

An n-butyl cyanoacrylate adhesive containing 30% w/w dibutylphthalate plasticizer and 0.2% methyltriacetoxysilane was prepared as in Example 8 below and used for bonding crystal glass as described below.

Various household ornaments manufactured from lead crystal glass (minimum 24% PbO) were broken to give irregular shaped fragments. The fragments were bonded along the line of fracture and the parts held together until the adhesive had fixtured to give handling strength. The joints were allowed to cure fully for 24 hours at RT. The bonds were then tested for durability by repeated cycles in a domestic dishwasher as described in Example 2 above. The attached test results show excellent resistance to this demanding treatment.

| Type of lead crystal glass | Fixture Time (Seconds) | Dishwasher (Cycles) | |
|---|---|---|---|
|  |  | Run 1 | Run 2 |
| Waterford Crystal | 15–30 | 35 | 67 |
| Galway Crystal | 15–30 | 46 | 49 |
| Tipperary Crystal | 15–30 | 59 | 99 |
| Cristal d'Arques | 15–30 | 103 | 117 |

Waterford, Galway, Tipperary and Cristal d'Arques are trade marks.

Example 8

Adhesive formulations were prepared as follows:

A. n-Butyl cyanoacrylate monomer containing 30% w/w dibutyl phthalate.

B. Formulation A plus 0.2% methyltriacetoxy silane.

C. n-Butyl CA monomer control.

Formulation B was prepared by first dissolving the silane in the plasticizer and then adding this solution to the CA monomer to give the final adhesive formulation.

Soda glass test pieces of dimensions 50.8×25.4×4 mm were cleaned with isopropyl alcohol and deionized water and allowed to dry. Overlapped joints with a bonded area of 322.5 mm$^2$ were prepared with each adhesive and allowed to cure for 24 hours at RT (2° C.+3° C.). The boundaries of the joint were marked. One end of each bonded assembly was clamped to a support. A weight (5 kg) was suspended from the other end of the joint to give a static stress of 0.16N/mm$^2$ The test rig was stored at 20° C.+3° C. and the bonds examined weekly for failure or any indication of slippage or creep in the bonded overlap. After three months the bond involving the control adhesive (Formulation C above) was observed to have failed or come apart. The bonds prepared with Formulations A and B were still intact after sixteen months with no indication of movement in the bond line. At this stage the tests were discontinued. A formulation containing a relatively large percentage w/w plasticizer would normally be expected to allow slippage or creep under the conditions of this Example. Surprisingly no such effects were observed for Formulation A containing 33% w/w dibutylphthalate.

Example 9

Cyanoacrylate based adhesive products or formulations as described below were used to prepare glass-glass bonds using the method outlined in Example 2. The bonds were cured for 24 hours at RT and then placed on an internal window ledge with full exposure to daylight. The bonds were examined weekly for (a) bond failure and (b) yellowing or other discoloration of the bond line. The attached results show that none of the bonds showed any change in appearance after thirteen months and bond failure was only observed with bonds prepared with unplasticized adhesives (Formulations A and B).

Formulations were as follows (DBP=dibutylphthalate, CA=cyanoacrylate). Formulations containing silanes were prepared as described in Example 8.:

A. Ethyl CA adhesive (Loctite product no. 406 All Loctite products are available commercially from Loctite (Ireland) Limited, Dublin, Ireland or Loctite Corporation, Hartford Conn., USA).
B. n-Butyl CA monomer+0.5% Calixarene.
C. n-Butyl CA (Loctite 413)+20% DBP+0.5% Calixarene.
D. n-Butyl CA (Loctite 413)+30% DBP+0.5% Calixarene.
E. n-Butyl CA (Loctite 413)+20% DBP+0.2% vinyltriacetoxysilane+0.5% Calixarene.
F. n-Butyl CA (Loctite 413)+20% DBP+0.2% methyl triacetoxysilane+0.5% Calixarene.
G. n-Butyl CA Monomer+20% DBP.
H. n-Butyl CA Monomer+20% DBP+0.05% 3-(methacryloxy)propyl trimethoxysilane.
I. n-Butyl CA Monomer+20% DBP+0.05% 3-(methacryloxy)propyl trimethoxysilane.
J. n-Butyl CA Monomer+30% DBP.
K. n-Butyl CA Monomer+20% DBP+2.0% 3-(methacryloxy)propyl trimethoxysilane.
L. n-Butyl CA Monomer+20% DBP+1.0% vinyltriacetoxysilane.
M. n-Butyl CA Monomer+20% DBP+0.2% methyltriacetoxysilane.

Results (Example 9)

Durability and Resistance to Yellowing of Glass-Glass Bonds Exposed to Daylight for 18 months. The test was discontinued after 18 months.

| ADHESIVE | OBSERVATIONS after 18 Months |
| --- | --- |
| A and B | Debonded < 8 months No discoloration. |
| C, D, E, F, G, H, I, J, K, L and M | No debonding or yellowing. |

Example 10

Dibutyl phthalate was added to Loctite product number 413 (a commercially available n-butyl cyanoacrylate adhesive) at concentrations of zero, 10, 15, 18, 21, 24 and 27% w/w. These adhesive mixtures were each divided into two parts; one part in each case being kept unchanged as comparative control while the second part was altered by the addition of 0.2% methyltriacetoxy silane.

The adhesives were then used to bond glass test pieces as described in Example 2. After curing at RT for 24 hours the bonds were tested for durability using the dishwasher cleaning procedure described in Example 2. The results are summarized below and show the following:

a) Standard butyl cyanoacrylate adhesives, as exemplified by Loctite product number 413, do not give a durable bond on glass.
b) The addition of plasticizer alone, even at concentrations of up to 27% w/w, give only a moderate improvement in glass bonding durability.
c) Adhesive formulations containing a combination of butyl cyanoacrylate, plasticizer and silane show a moderate improvement in durability when used to bond glass but the most significant benefit is only achieved if the plasticizer concentration exceeds a threshold level of about 21 to 27%.

| Formulation with Loctite Product No. 413 | | Dishwasher Durability (Cycles) | | |
| --- | --- | --- | --- | --- |
| DBP (%) | Silane (%) | Run 1 | Run 2 | Run 3 |
| 10 | Zero | 2 | 2 | 4 |
| 15 | Zero | 2 | 3 | 3 |
| 18 | Zero | 3 | 4 | 4 |
| 21 | Zero | 3 | 4 | 5 |
| 24 | Zero | 4 | 4 | 5 |
| 27 | Zero | 5 | 6 | 6 |
| 10 | 0.2 | 5 | 6 | 7 |
| 15 | 0.2 | 7 | 7 | 8 |
| 18 | 0.2 | 7 | 7 | 7 |
| 21 | 0.2 | 7 | 7 | 60 |
| 24 | 0.2 | 7 | 7 | 60 |
| 27 | 0.2 | 116 | 116 | 116 |
| Controls | | | | |
| Zero | Zero | 2 | 3 | 4 |
| Zero | 0.2 | 5 | 7 | 8 |

Industrial Applicability

This invention provides adhesive compositions which are articles of manufacture.

What is claimed is:

1. A one-part adhesive composition comprising:
   (a) a cyanoacrylate monomer;
   (b) at least one plasticizer in the amount of 28 to 60% w/w by weight of the composition; and
   (c) at least one silane in the amount of 0.1 to % to 5.0% w/w by weight of the composition.
2. An adhesive composition according to claim 1 wherein the plasticizer content is in the range of 28 to 40% w/w.
3. An adhesive composition according to claim 1 wherein the plasticizer content is in the range 28 to 35% w/w.
4. An adhesive composition according to claim 1 wherein the silane content is in the range 0.02 to 3.0% w/w.
5. An adhesive composition according to claim 1 wherein the silane content is in the range of 0.05 to 1.0% w/w.
6. An adhesive composition according to claim 1 wherein the plasticizer is selected from the group consisting of alkyl phthalates, azelates, adipates, sebacates, citrates, phosphates, succinates, benzoates and trimellitates.
7. An adhesive composition according to claim 1 wherein the silane is selected from the silanes of the Formula:

wherein: n=1 to 4; and
each R' and R" which may be the same or different represents H, hydrocarbyl, aryl, hydrocarbylaryl or a substituted derivative thereof.
8. An adhesive composition according to claim 7 wherein: n is 2 or 3.
9. An adhesive composition according to claim 7 wherein: R" is a member selected from the group consisting of $C_1$–$C_5$ alkyl, $C_1$–$C_5$ alkenyl, and —CO—R''', wherein R''' is a member selected from the group consisting of $C_1$–$C_5$ alkyl and $C_1$–$C_5$ alkenyl, or a substituted derivative thereof.
10. An adhesive composition according to claim 7 wherein:
R' is a member selected from the group consisting of $C_1$–$C_5$ alkyl, $C_1$–$C_5$ alkenyl, wherein m is 0 to 5 or —(CH$_2$)$_m$—O—CO—R''' wherein R''' is a member selected from the group consisting of C$_1$–C$_5$ alkyl and C$_1$–C$_5$ alkenyl or a substituted derivative thereof and m is 0 to 5.

11. An adhesive composition according to any preceding claim wherein the silane is selected from the group consisting of vinyltriethoxy silane, vinyltrimethoxy silane, glicidoxypropyltrimethoxy silane, ethyltriethoxy silane, dimethyldiacetoxy silane, propyltriacetoxy silane vinylmethyldiacetoxy silane, methyltriacetoxy silane, 3-(methacryloxy/propyltrimethoxy silane and vinyltriacetoxy silane.

12. An adhesive composition according to claim 1 wherein the silane is selected from the silanes of the general formula:

wherein R$_1$, R$_2$, R$_3$, and R$_4$, each independently represent hydrocarbyl, aryl, hydrocarbylaryl, or a substituted derivative thereof, H or halogen or the group —OR$_5$ wherein R$_5$ represents hydrocarbyl, aryl or hydrocarbylaryl or a substituted derivative thereof and any two of the groups R$_1$, R$_2$, R$_3$ and R$_4$ may be taken together with the silicon atom to form a cycle;

with the proviso that at least one of R$_1$, R$_2$, R$_3$ or R$_4$ represents hydrocarbyl, aryl, hydrocarbylaryl or a substituted derivative thereof.

13. An adhesive composition according to claim 1 wherein the monomer is butyl cyanoacrylate.

14. An adhesive composition according to claim 1 wherein the monomer is n-butyl cyanoacrylate.

15. A method of bonding substrates which comprises the steps of applying a one-part adhesive composition according to claim 1 to at least one of the substrates and bringing the substrates together.

16. The method according to claim 15, wherein at least one of the substrates is constructed of glass.

17. An adhesive composition as in claim 1 wherein the cyanoacrylate monomer is of the formula CH$_2$=C(CN)COOR where R is alkyl of 4–10 carbon atoms, or an alkoxyalkyl having 1–10 carbon atoms in the alkoxy group and 4–10 atoms in the alkyl group therein.

18. An adhesive as in claim 17 wherein the silane has the formula:

where
n is 1–4;
each R' is the same or different and is H, or a unsubstituted or substituted hydrocarbyl, aryl or hydrocarbylaryl group; and
each R'' is the same or different and is H or a unsubstituted or substituted group selected from C$_{1-5}$ akyl, C$_{1-5}$ slkenyl and —CO—R''' where R''' is C$_{1-5}$ akyl or C$_{1-5}$ alkenyl.

19. An adhesive as in claim 17 wherein R is butyl or octyl.

20. An article formed by bonding a pair of substrates with an adhesive composition as in claim 1.

21. An adhesive bond formed between two substrates, at least one of which is glass, the bond formed of a cured adhesive, the adhesive having a composition as in claim 1.

22. A one part adhesive comprising:
(a) a cyanoacrylate monomer;
(b) at least one plasticizer in the amount of 28 to 60% w/w by weight of the composition; and
(c) at least one silane in the amount of 0.01% to 5.0% w/w by weight of the composition, wherein the silane is selected from the group consisting of vinyltriethoxy silane, vinyltrimethoxy silane, glycidoxypropyltrimethoxy silane, ethyltriethoxy silane, dimethyldiacetoxy silane, propyltriacetoxy silane, vinylmethyldiacetoxy silane, methyltriacetoxy silane, 3-(methacryloxy) propyltrimethoxy silane, and vinyltriacetoxy silane.

23. An adhesive composition as in claim 22 wherein the plasticizer is in the amount of 28–40%.

24. An adhesive composition as in claim 22 wherein the plasticizer is in the amount of 28–35%.

25. A one-part adhesive composition comprising:
(a) a cyanoacrylate monomer;
(b) at least one plasticizer in the amount of 25 to 60% w/w by weight of the composition; and
(c) at least one silane in the amount of 0.1 to % to 5.0% w/w by weight of the composition, the silane having the formula:

where
n is 1–4;
each R' is the same or different and is H, or a unsubstituted or substituted hydrocarbyl, aryl, or hydrocarbylaryl group; and
each R'' is the same or different and is H or a unsubstituted or substituted group selected from C$_{1-5}$ alkyl, C$_{1-5}$ alkenyl and —CO—R''' where R''' is C$_{1-5}$ alkyl, or C$_{1-5}$ alkenyl.

26. A method of bonding a pair of substrates, at least one of which is glass, the method comprising applying a composition as in claim 25 to at least one of the substrates and bringing the substrates together.

27. A method as in claim 26 where the pair of substrates, when bonded, forms a article of dish ware.

28. An article formed by bonding a pair of substrates according to the method of claim 26.

29. A method of repairing a broken article comprising at least first and second broken pieces having mutual mating surfaces, the method comprising applying an adhesive composition as in claim 25 to at least one said mutual mating surface, and joining the first and second broken piece along said mating surfaces.

30. A method as in claim 29 wherein the mating surfaces of the broken article are glass surfaces.

31. A method as in claim 29 wherein the plasticizer is present in the adhesive composition in an amount of at least 28% by weight of the composition.

32. An article formed by bonding a pair of substrates with an adhesive composition as in claim 25.

33. An adhesive bond formed between two substrates, at least one of which is glass, wherein the bond is formed of a cured adhesive, the adhesive having a composition as in claim 25.

* * * * *

UNITED STATES PATENT AND TRADEMARK OFFICE
CERTIFICATE OF CORRECTION

PATENT NO. : 6,607,632 B1
DATED : August 19, 2003
INVENTOR(S) : Patrick F. McDonnell et al.

It is certified that error appears in the above-identified patent and that said Letters Patent is hereby corrected as shown below:

Column 1,
Line 18, change "by-any" to -- by any --
Line 33, change "of.Russian" to -- of Russian --

Column 15,
Line 66, change "slkenyl" to -- alkenyl --

Signed and Sealed this

Tenth Day of August, 2004

JON W. DUDAS
*Acting Director of the United States Patent and Trademark Office*